W. H. OSBORN.
SHIPPING PACKAGE.
APPLICATION FILED OCT. 30, 1914.
1,131,948.
Patented Mar. 16, 1915.
2 SHEETS—SHEET 1.
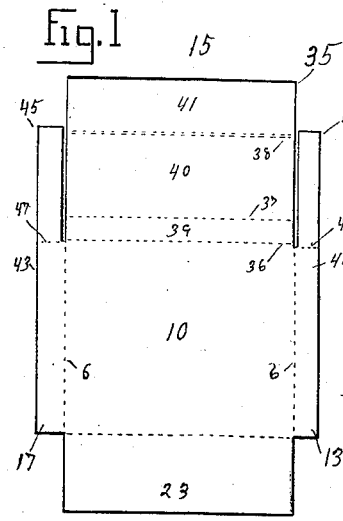
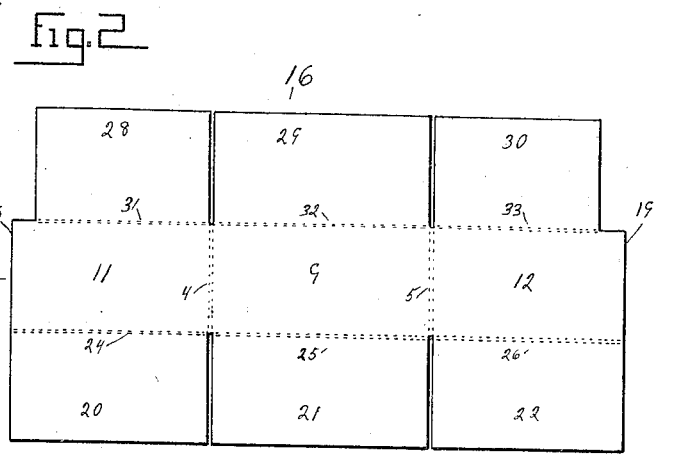
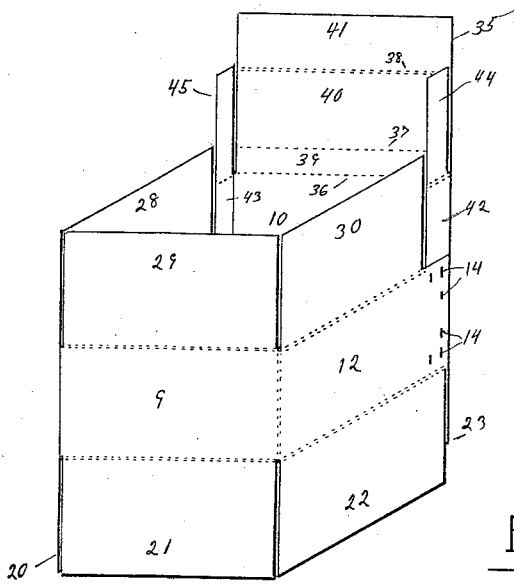
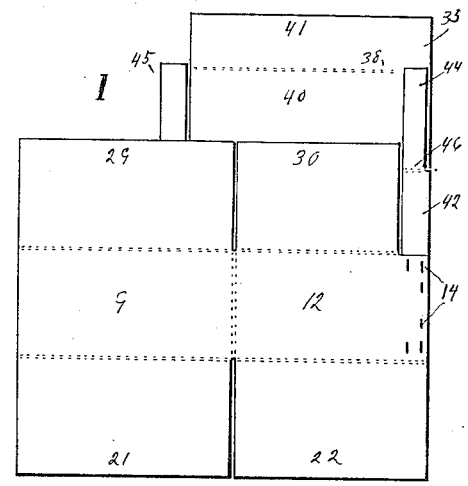
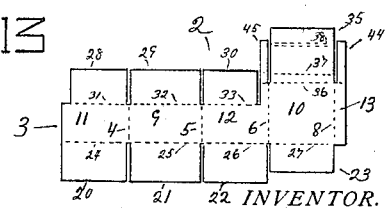
WITNESSES:
F. H. Kappa
Marguerite McAllister
INVENTOR.
William H. Osborn
BY
W. B. Munnell
ATTORNEY.

W. H. OSBORN.
SHIPPING PACKAGE.
APPLICATION FILED OCT. 30, 1914.
1,131,948.
Patented Mar. 16, 1915.
2 SHEETS—SHEET 2.
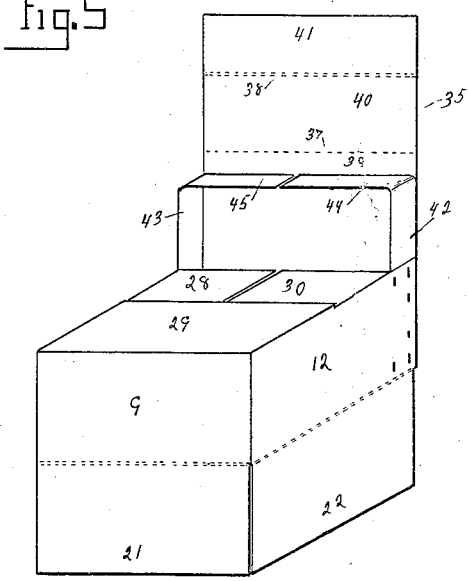
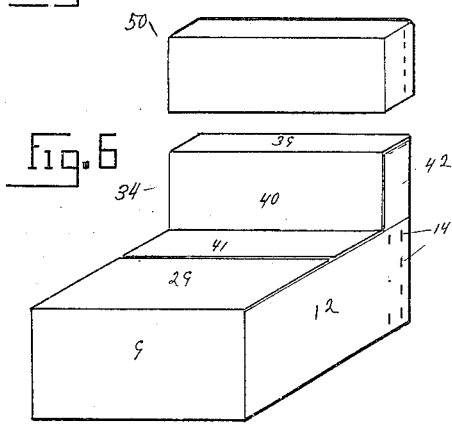
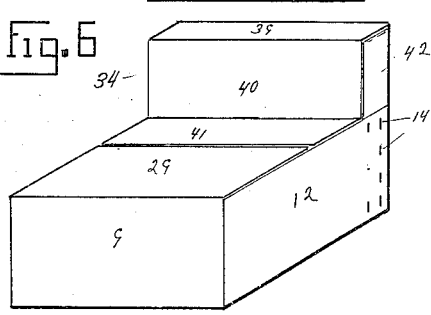
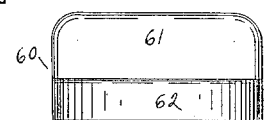
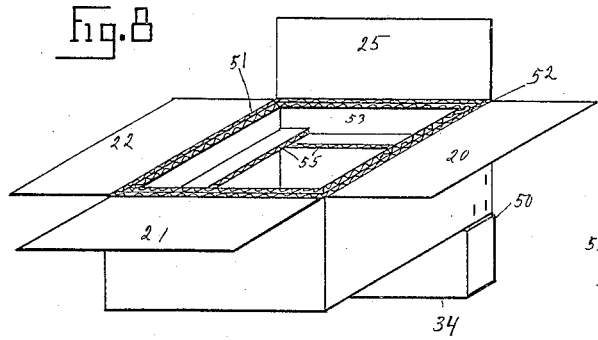
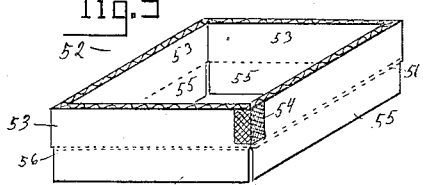
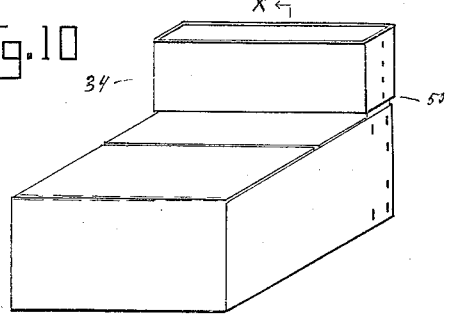
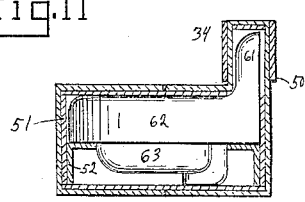
WITNESSES:
F. H. Kappa
Marguerite McAllister
INVENTOR.
William H. Osborn
BY
W. B. Mummell
ATTORNEY.
THE NORRIS PETERS CO., PHOTO-LITHO., WASHINGTON, D. C.

UNITED STATES PATENT OFFICE.

WILLIAM H. OSBORN, OF LOUISVILLE, KENTUCKY, ASSIGNOR TO STANDARD SANITARY MANUFACTURING COMPANY, OF PITTSBURGH, PENNSYLVANIA, A CORPORATION OF NEW JERSEY.

SHIPPING-PACKAGE.

1,131,948.  Specification of Letters Patent.  Patented Mar. 16, 1915.

Application filed October 30, 1914. Serial No. 869,367.

*To all whom it may concern:*

Be it known that I, WILLIAM H. OSBORN, a citizen of the United States, residing in the city of Louisville, county of Jefferson, and State of Kentucky, have invented a certain new and useful Improvement in Shipping-Packages, of which the following is a specification.

This invention relates to shipping packages, designed for the reception of irregular shaped articles, the embodiment represented herewith being designed with special reference to lavatories, of that class in which the bowl, apron and back are cast in one piece.

The shipping packages, at present, in general use for this class of articles are wooden crates, which are objectionable on account of their weight and bulk, and consequent high charges for freight and storage; and also on account of the incased article becoming soiled by dust and dirt which passes between the slats of the crate; necessitating considerable labor to clean the article if it has been stored for any considerable period of time.

An object of this invention is to provide a shipping package which will completely incase the contained article, protecting it from dust and dirt, whereby it will reach the consumer unsoiled.

Another object, is the provision of a shipping package which, being constructed of light material and conformed to the contour of the contained article will occupy a minimum of space thereby entailing reduced charges for storage and transportation.

With the foregoing and other objects in view, my invention consists of the novel arrangement and construction illustrated in the accompanying drawing which forms a part of this specification, wherein is set forth an embodiment of the invention, but it is to be understood that such changes and modifications may be resorted to as come within scope of the claims appended hereunto.

In the drawings wherein like reference characters designate like parts, Figure 1, is a plan of the blank which forms the back of the carton; Fig. 2, a plan of the blank which forms the body of the carton; Fig. 3, a perspective view showing the back and body united; Fig. 4, a plan view of the carton as collapsed; Fig. 5, a perspective of the carton partly erected; Fig. 6, a perspective of the carton completely erected; Fig. 7, a perspective of a sleeve which fits over an extension of the carton; Fig. 8, a perspective of the shipping package in position for the reception of the article which is to be packed, a brace member being shown, which is removed prior to the introduction of the article, and subsequently replaced; Fig. 9, a perspective of the brace member; Fig. 10, a perspective of the shipping package packed and sealed; Fig. 11, a section on line $x$—$x$ of Fig. 10, showing a contained lavatory in side elevation; Fig. 12, a front elevation of a lavatory of the style which this embodiment of my invention is designed to incase; Fig. 13, a plan view of a one piece blank from which the carton may be formed.

This invention comprises a collapsible carton —1— which may be formed of any suitable material, such as fiber board, or pulp board, of commerce. It may be formed from a one piece blank —2— (as illustrated in Fig. 13) comprising a body portion —3— which is divided by creased or scored folding lines —4, 5, 6, and 8— into sections —9, 10, 11, and 12— which form respectively, the front, back and side walls of the carton, and a flap —13—, to which the opposite end is secured by suitable means, as by the use of an adhesive, or with staples —14—.

For economy in the use of material, the blank may be in two sections —15 and 16— (see Figs. 1 and 2) in which case the back 10 will have a flap —17— on the side opposite the flap 13, and the ends of —18 and 19— of section 16, will be secured respectively thereto. Extended from the lower edges of sections 9, 10, 11, and 12, are flaps or wings —20, 21, 22, and 23— which when folded in on the creased or scored lines —24, 25, 26, and 27— form the bottom of the carton. Extended from the upper edges of the sections 9, 11, and 12 are flaps —28, 29 and 30— which when folded in on the folding lines —31, 32, and 33— form the top of the body of the carton. The back wall 10 is of greater height than the other walls 9, 11, and 12 and forms the back of an extension —34— of the carton. A wing or flap —35— extended from the upper edge of the back wall 10 is divided by creased folding lines —36, 37, and 38— into sections —39, 40, and 41— of which 39 and 40 form respectively the top and front wall of the extension 34, and section 41 a portion of the top of the main body of the carton. Extended from the upper ends of the flaps 13 and 17 are wings —44 and 45— which fold in on lines —46 and 47— to form the top of the extended portion 34. The attaching flaps 13 and 17 are of a width necessary to form the sides of the extension 34, and extend the full height of the back wall 10. It is to be observed that where folding lines are indicated by single dotted lines the part is to be folded toward the observer, and where they are indicated by double dotted lines the parts are to be folded away from the observer. In erecting the carton, the flaps 13 and 17, are to be turned up at right angles to the back wall 10. The sides 11 and 12 are to be turned down at right angles, to the front wall 9, placed over the back and attached to the flaps 13 and 17 by suitable means such as staples 14.

When thus assembled as shown in Fig. 3, the succeeding steps to prepare it for use are to fold the flaps 28, 29, 30, 44, and 45 in, as shown in Fig. 5. The wing 35, is then folded on lines 36, 37, and 38 in to the position shown in Fig. 6. A sleeve —50— is then slid down over the extension 34, and serves to secure the wing 35 in place and to stiffen the entire carton. The sleeve may be secured in position by suitable means, such as an adhesive, which may be applied to the inner surface of the sleeve, or the outer surface of the extension 34 before the sleeve is placed thereon. It will be observed that, in closing the top, either the flaps 28 and 30 or the flaps 29 and 41 may be folded down first, in either case the overlying flaps are secured to the underlying ones by suitable means, such as an adhesive. With the carton formed up as described a cushion lining —51—, of suitable material, preferably that known in the art as corrugated straw board, is placed about the inner side of the body of the carton. The lavatory —60—, which is to be packed, is then placed in the carton, the back —61— thereof entering the extension 34, a brace member —52— comprising a rectangular frame, which fits snugly within the cushion lining 51, is placed in position resting on the apron —62— of the lavatory. The side walls —53— of the brace extend from the apron to the bottom of the carton and prevent any vertical movement of the lavatory, wings —55— extended horizontally from the side walls 53, being folded on lines —56—, bear against the sides of the bowl —63— and prevent any lateral movement of the lavatory. The bottom flaps of the carton 21 and 23, and 20 and 22 are then folded over, the overlying flaps being secured to the underlying flaps by suitable means such as an adhesive. It will be observed that the rigidity of the carton is assured by the sleeve that fits about the extension and by the brace member 52, within the carton and that any shifting of the lavatory is prevented by the vertical side walls and horizontal wings of said brace member.

It is thought that the many advantages of my improved shipping package will be appreciated and understood from the foregoing description by persons skilled in the art pertaining thereto and that any one may make and use the same therefrom, and

I claim:

1. A shipping package comprising a carton having an extension from the top at one side thereof, said carton having connected walls, flaps extended from the lower edges of said walls folded in to form the bottom of the carton, one of said walls continued above the others to form the back of said extension flaps extended from the upper edges of said walls folded to form the top of the main body of the carton and said extension, and a sleeve about said extension.

2. In a shipping package, a collapsible carton comprising a body, with an extension from the top at one side thereof, said carton having connected front, back, and side walls, the back wall being continued above the others of said walls, to form the back of said extension, flaps extended from the lower edges of said walls adapted to be folded in to form the bottom of the carton, flaps extended from the upper edges of said walls adapted to be folded to form the top of the body of the carton and of said extension.

3. In a shipping package, a collapsible carton comprising a body, with an extension from the top at one side thereof, said carton having connected front, back, and side walls, the back wall being continued above the others of said walls, to form the back of said extension, flaps extended from the lower edges of said walls adapted to be folded to form the bottom of the carton, flaps extended from the upper edges of said walls adapted to be folded to form the top of the body of the carton and of said extension and a sleeve adapted to fit about said extension.

4. In a shipping package, a carton comprising a body portion with an extended portion rising from the top at the back thereof, said carton having connected front, back, and side walls the back wall being continued and side walls the back wall being continued to the top of said extended portion, flaps extended from the lower edges of said walls tended and folded in to form the bottom of the carton, flaps extended from the upper edges of said walls to form the top, the flap extended from the back wall also forming the front wall of the extended portion.

5. In a shipping package, a carton comprising a body portion with an extended portion rising from the top at the back thereof, said carton having connected front, back and side walls, the back wall being continued to the top of said extended portion, flaps extended from the lower edges of said walls and folded in to form the bottom of the carton, flaps extended from the upper edges of said walls to form the top, the flap extended from the back wall also forming the front wall of the extended portion, and a sleeve about said extended portion.

6. In a shipping package, a carton comprising a body portion with an extended portion rising from the top at the back thereof, said carton having connected front, back and side walls, the back wall being continued to the top of said extended portion, flaps extended from the lower edges of said walls and folded in to form the bottom of the carton, flaps extended from the upper edges of said walls to form the top, the flap extended from the back wall also forming the front wall of the extended portion, a sleeve about said extended portion and a brace member within said body portion, said member comprising side walls and inwardly extended horizontal wings.

7. In a shipping package, a carton comprising a body portion with an extended portion rising from the top at the back thereof, said carton having front, back and side walls connected, the back wall being continued to the top of said extended portion, flaps extended from the lower edges of said walls and folded in to form the bottom of the carton, flaps extended from the upper edges of said walls to form the top, the flap extended from the back wall also forming the front wall of the extended portion, a sleeve about said extended portion and a cushion lining in said body portion and a brace member within said lining, said member comprising side walls and inwardly extended horizontal wings.

8. A shipping package comprising a carton with a vertical extension from the top at the back thereof, said carton having connected front, back and side walls, the back wall being continued to the top of said extension, sides for said extension projecting forward from the continued portion of the back, flaps extended from the lower edges of said walls to form the bottom, and flaps extended from the upper edges of said walls to form the top of said carton.

9. A shipping package comprising a carton with a vertical extension from the top at the back thereof, said carton having connected front, back and side walls, the back wall being continued to the top of said extension, sides for said extension projecting forward from the continued portion of the back, flaps extended from the lower edges of said walls to form the bottom, flaps extended from the upper edges of said walls to form the top of said carton, and a sleeve about said extension.

10. A shipping package comprising a carton, with a vertical extension from the top at the back thereof, said carton having connected front, back, and side walls, the back wall being continued to the top of said extension, sides for said extension, projecting forward from the continued portion of the back, flaps extended from the lower edges of said walls folded to form the bottom, flaps extended from the upper edges of said walls folded to form the top of said carton, and a sleeve adapted to fit about said extension.

11. A shipping package comprising a carton, with a vertical extension from the top at the back thereof, said carton having connected front, back and side walls, the back wall being continued to the top of said extension, sides for said extension projecting forward from the continued portion of the back, flaps extended from the lower edges of said walls folded to form the bottom, flaps extended from the upper edges of said walls folded to form the top of said carton, a sleeve adapted to fit about said extension, and a brace member within said carton, said brace member comprising side walls and inwardly extended horizontal wings.

12. A shipping package comprising a collapsible carton, with a vertical extension from the top at the back thereof, said carton having connected front, back, and side walls, the back wall being continued to the top of said extension, sides for said extension projecting forward from the continued portion of the back, flaps extended from the lower edges of said walls adapted to be folded in to form the bottom, and flaps extended from the upper edges of said walls adapted to be folded to form the top of said carton.

13. A shipping package comprising a collapsible carton with a vertical extension from the top at the back thereof, said carton having connected front, back and side walls, the back wall being continued to the top of said extension, sides for said extension projecting forward from the continued portion of the back, flaps extended from the lower edges of said walls adapted to be folded in to form the bottom, flaps extended from the upper edges of said walls adapted to form the top of said carton, a sleeve adapted to fit about said extension, and a brace member within said carton, said brace member comprising side walls and inwardly extended horizontal wings.

14. A shipping package comprising a collapsible carton with a vertical extension from the top at the back thereof, said carton having connected front, back, and side walls, the back wall being continued to the top of said extension, sides for said extension projecting forward from the continued portion of the back, flaps extended from the lower edges of said walls adapted to be folded in to form the bottom, flaps extended from the upper edges of said walls adapted to be folded to form the top of said carton, a sleeve adapted to fit about said extension, a cushion lining disposed about said walls, and a brace member adapted to fit within said lining, said member comprising side walls and inwardly extended horizontal wings.

WILLIAM H. OSBORN.

Witnesses:
W. B. MUNNELL,
MARGUERITE MCALLISTER.

Copies of this patent may be obtained for five cents each, by addressing the "Commissioner of Patents, Washington, D. C."